US012802176B2

(12) United States Patent
He et al.

(10) Patent No.: US 12,802,176 B2
(45) Date of Patent: Nov. 17, 2026

(54) PANEL REPRESENTATION AND DISTORTION REDUCTION IN 360 PANORAMA IMAGES

(71) Applicant: TENCENT AMERICA LLC, Palo Alto, CA (US)

(72) Inventors: Lu He, Sunnyvale, CA (US); Haozheng Yu, Palo Alto, CA (US); Haichao Zhu, Palo Alto, CA (US); Kelin Liu, Palo Alto, CA (US); Weiwei Feng, Palo Alto, CA (US); Xiaozhong Xu, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 314 days.

(21) Appl. No.: 18/666,438

(22) Filed: May 16, 2024

(65) Prior Publication Data

US 2024/0386528 A1 Nov. 21, 2024

Related U.S. Application Data

(60) Provisional application No. 63/467,569, filed on May 18, 2023.

(51) Int. Cl.
*G06T 5/60* (2024.01)
*G06T 3/4038* (2024.01)
(Continued)

(52) U.S. Cl.
CPC .............. *G06T 5/60* (2024.01); *G06T 3/4038* (2013.01); *G06T 3/4046* (2013.01); *G06T 5/50* (2013.01);
(Continued)

(58) Field of Classification Search
CPC ....... G06T 5/60; G06T 3/4038; G06T 3/4046; G06T 5/50; G06T 5/80; G06T 2207/20081; G06T 2207/20084; G06T 2207/20221
(Continued)

(56) References Cited

U.S. PATENT DOCUMENTS

| | | | | |
|---|---|---|---|---|
| 6,064,399 | A | 5/2000 | Teo | |
| 2015/0199839 | A1 | 7/2015 | Chon | |
| 2017/0011488 | A1 * | 1/2017 | Cohen | G06T 7/38 |

OTHER PUBLICATIONS

Shen, Weichao, et al. "PanoViT: Vision transformer for room layout estimation from a single panoramic image." arXiv preprint arXiv: 2212.12156 (2022) (Year: 2022).*

(Continued)

*Primary Examiner* — Jennifer Mehmood
*Assistant Examiner* — Dustin Bilodeau
(74) *Attorney, Agent, or Firm* — Crowell & Moring LLP

(57) ABSTRACT

This disclosure relates generally to image processing and specifically to processing panorama images using neural networks to generate depth maps, layouts, semantic maps or the like with reduced distortion and improved continuity. Methods and systems are described for generating such maps by leveraging several essential properties of these panorama images and by using a panorama panel representation and a neural network framework. A panel geometry embedding network is incorporated for encoding both the local and global geometric features of the panels in order to reduce negative impact of panoramic distortion. A local-to-global transformer network is also incorporated for capturing geometric context and aggregating local information within a panel and panel-wise global context.

18 Claims, 6 Drawing Sheets

(51) Int. Cl.
*G06T 3/4046* (2024.01)
*G06T 5/50* (2006.01)
*G06T 5/80* (2024.01)

(52) U.S. Cl.
CPC ...... *G06T 5/80* (2024.01); *G06T 2207/20081* (2013.01); *G06T 2207/20084* (2013.01); *G06T 2207/20221* (2013.01)

(58) Field of Classification Search
USPC .......................................................... 382/156
See application file for complete search history.

(56) References Cited

OTHER PUBLICATIONS

Li, Yuyan, et al. "Omnifusion: 360 monocular depth estimation via geometry-aware fusion." Proceedings of the IEEE/CVF Conference on Computer Vision and Pattern Recognition. 2022 (Year: 2022).*
Pintore, Giovanni, et al.; "AtlantaNet: inferring the 3D indoor layout from a single 360° image beyond the Manhattan world assumption." Computer Vision—ECCV 2020: 16th European Conference, Glasgow, UK, Aug. 23-28, 2020, Proceedings, Part VIII. Cham: Springer International Publishing, 2020; 16 pages.
Song, Shuran, et al. "Im2pan03d: Extrapolating 360 structure and semantics beyond the field of view." Proceedings of the IEEE Conference on Computer Vision and Pattern Reconition. 2018; 10 pages.
Sun, Cheng, et al.; "Hohonet: 360 indoor holistic understanding with latent horizontal features." Proceedings of the IEEE/CVF Conference on Computer Vision and Pattern Reconition. 2021; 10 pages.
Zioulis, Nikolaos, et al.; "Omnidepth: Dense depth estimation for indoors spherical panoramas." Proceedings of the European Conference on Computer Vision (ECCV). 2018; 18 pages.
Zou, Chuhang, et al. "Layoutnet: Reconstructing the 3d room layout from a single rgb image." Proceedings of the IEEE conference on computer Vision and pattern recognition. 2018; 9 pages.
International Search Report and Written Opinion issued in International Patent Application No. PCT/US24/29975 dated Aug. 28, 2024.
Yu et al. "PanelNet: Understanding 360 Indoor Environment via Panel Representation." In Proceedings of the IEEE/CVF Conference on Computer Vision and Pattern Recognition, May 16, 2023, 10 pages.

* cited by examiner

PANEL REPRESENTATION AND DISTORTION REDUCTION IN 360 PANORAMA IMAGES

INCORPORATION BY REFERENCE

This application is based on and claims the benefit of priority to U.S. Provisional Patent Application No. 63/467,569 filed on May 18, 2023 and entitled "Methods of understanding Indoor Environments using Panel Representation in 360 Panorama Images," which is herein incorporated by reference in its entirety.

TECHNICAL FIELD

This disclosure relates generally to image processing and specifically to processing panorama images using neural networks to generate depth maps, layouts, semantic maps or the like with reduced distortion and improved continuity.

BACKGROUND

Semantic content extraction/prediction and object recognition from digital images using computer vision techniques is essential for many autonomous applications. Panorama images generated in various formats may differ from typical perspective 2D images in various geometric and other properties. Computer vision techniques and architecture for processing panorama images may be designed to explore such properties in order to improve prediction accuracy and reduce negative effects of panoramic distortions.

SUMMARY

This disclosure relates generally to image processing and specifically to processing panorama images using neural networks to generate depth maps, layouts, semantic maps or the like with reduced distortion and improved continuity. Methods and systems are described for generating such maps by leveraging several essential properties of these panorama images and by using a panorama panel representation and a neural network framework. A panel geometry embedding network is incorporated for encoding both the local and global geometric features of the panels in order to reduce negative impact of panoramic distortion. A local-to-global transformer network is also incorporated for capturing geometric context and aggregating local information within a panel and panel-wise global context.

In some example implementations, a method for processing a panorama image dataset by a computing circuitry is disclosed. The method may include generating a plurality of data panels from the panorama image dataset; executing a first neural network to process the plurality of data panels to generate a set of embeddings representing geometric features of the plurality of data panels; executing a second neural network to process the plurality of data panels and the set of embeddings to generate a plurality of mapping panels; and fusing the plurality of mapping panels into a mapping dataset of the panorama image dataset.

In the example implementation above, the mapping dataset comprises one of a depth map, a layout map, or a semantic map corresponding to the panorama image dataset.

In any one of the example implementations above, the panorama image dataset comprises a data array in two dimensions; and the each of the plurality of data panels comprises a subarray of the data array in an entirety of a first dimension of the two dimensions and a segment of a second dimension of the two dimensions.

In any one of the example implementations above, the first dimension represents a gravitational direction of the panorama image dataset and the second dimension represents a horizontal direction of the panorama image dataset.

In any one of the example implementations above, the plurality of data panels are generated from the panorama image dataset consecutively using a window having a length of the entirety of the first dimension in the first dimension and a predefined width in the second dimension, the window sliding along the second dimension by a predefined stride.

In any one of the example implementations above, the window continuously slides across from one edge of the panorama image dataset in the second dimension into another edge of the panorama image dataset in the second dimension.

In any one of the example implementations above, the first neural network is configured to encode local and global geometric features of the plurality of data panels to reduce impact of geometric distortions in the panorama image dataset and to enhance preservation of geometric continuity across the plurality of mapping panels.

In any one of the example implementations above, the first neural network comprises a multilayer perceptron (MLP) network LP for processing geometric information extracted from the plurality of data panels to generate the set of embeddings comprising a set of global geometric features and a set of local geometric features of the plurality of the data panels.

In any one of the example implementations above, the second neural network is configured to process the plurality of data panels and reduce geometric distortions in the panorama image dataset based on the set of embeddings.

In any one of the example implementations above, the second neural network comprises: a down-sampling network; a transformer network; and an up-sampling network.

In the example implementations above, the down-sampling network is configured for processing the plurality of data panels and the set of embeddings to generate a series of down-sampled features with decreasing resolutions; the transformer network is configured for processing lowest resolution down-sampled features to generate transformed low-resolution features; and the up-sampling network is configured for processing the transformed low-resolution features and the series of down-sampled features to generate the plurality of mapping panels.

In any one of the example implementations above, the transformer network comprises a feature processor.

In any one of the example implementations above, the feature processor is configured to increase continuity of the geometric features.

In any one of the example implementations above, the feature processor is configured to aggregate local information within each of the plurality of data panels to capture panel-wise context.

Aspects of the disclosure also provide an electronic device or apparatus including a circuitry or processor configured to carry out any of the method implementations above.

Aspects of the disclosure also provide non-transitory computer-readable mediums storing instructions which when executed by an electronic device, cause the electronic device to perform any one of the method implementations above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
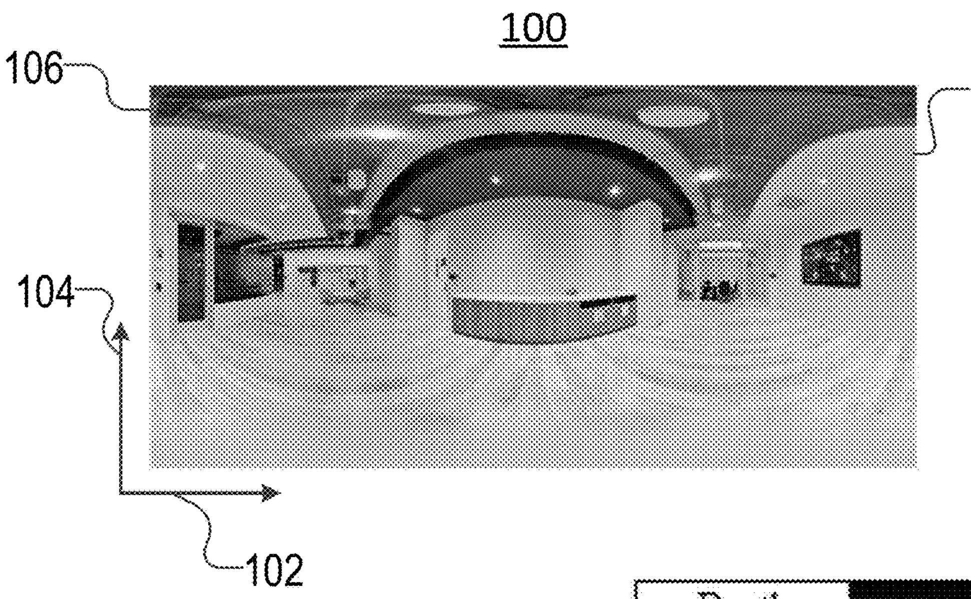
FIG. 1 shows an example 360 panorama image of an indoor scene in an equirectangular representation.

Throughout the specification and claims, terms may have nuanced meanings suggested or implied in context beyond an explicitly stated meaning. The phrase "in one embodiment/implementation" or "in some embodiments/implementations" as used herein does not necessarily refer to the same embodiment/implementation and the phrase "in another embodiment/implementation" or "in other embodiments" as used herein does not necessarily refer to a different embodiment. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of context-dependent meanings. Typically, "or" if used to associate a list, such as A, B or C, is intended to mean A, B, and C, here used in the inclusive sense, as well as A, B or C, here used in the exclusive sense. In addition, the term "one or more", "at least one", "a", "an", or "the" as used herein, depending at least in part upon context, may be used in a singular sense or plural sense. In addition, the term "based on" or "determined by" may be understood as not necessarily intended to convey an exclusive set of factors and may, instead, allow for existence of additional factors not necessarily expressly described, again, depending at least in part on context.

The disclosure below relates generally to image processing and specifically to processing panorama images using neural networks to generate depth maps, layouts, semantic maps or the like with reduced distortion and improved continuity. Methods and systems are described for generating such maps by leveraging several essential properties of these panorama images and by using a panorama panel representation and a neural network framework. A panel geometry embedding network is incorporated for encoding both the local and global geometric features of the panels in order to reduce negative impact of panoramic distortion. A local-to-global transformer network is also incorporated for capturing geometric context and aggregating local information within a panel and panel-wise global context.

Panorama Image Formats

In comparison to regular perspective 2D images taken from, for example, a normal camera with a fixed limited viewing angles, a panorama image offers a wide, e.g., 360 degrees, field of view (FoV) around a particular viewing axis. A panorama image may be taken by a specialized camera with a wide/multiple-lens optical system or may be created by stitching together a plurality of overlapping regular images taken from multiple perspective angles around the viewing axis. A full panorama image may be referred to as a 360 panorama and may be represented in digital form using one of several example data formats. One example format may be based on an equirectangular projection (ERP) representation. A panorama image in the ERP format may be represented by a dataset in a 2D pixel array, similar to a regular image, but may include full 360 panorama information with respect to the viewing axis. Each pixel of the panorama image of a 360 scene in the ERP formatted dataset contains perspective imaging information (e.g., RGB or YUV values) corresponding to a perspective viewing solid-angle unit in the 360 scene.

An ERP representation of an example 360 panorama image is illustrated in FIG. 1. The example 360 panorama image is represented by a 2D data array 100 along a horizontal direction 102 and a vertical direction 104. The example 360 scene representation is generated around a viewing axis along the vertical axis 104. The data array 100 thus contains image content with a continuously changing viewing angle in the range of full 360 degrees horizontally and within a particular vertical viewing angle range with a fixed perspective FoV. The horizontal direction as indicated in FIG. 1 thus represents a panning direction of the 360 panorama image. In the example of FIG. 1, the 2D pixels are uniformly distributed in the horizontal direction 102 and vertical direction 104.

Figure 2:
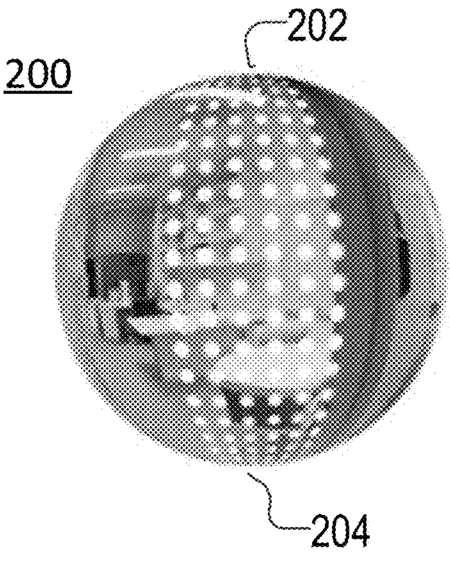
FIG. 2 illustrates a more realistic perspective polar view of the 360 panorama image of FIG. 1.

FIG. 2 shows a 3D view 200 of the example ERP-formatted 360 panorama image of FIG. 1, which represents a more realistic perspective view in comparison to the 2D pixel array of FIG. 1. The 3D FoV in FIG. 2 is basically characterized by two perspective viewing angles, one with a FoV range in the vertical direction, and the other spanning all 360 degrees around the vertical axis (i.e., the panning axis), as detailed further below. In comparison to the 3D perspective view, the 2D data array of FIG. 1 inherently includes a large perspective distortion towards the upper and lower edges 110 and 112, as these edges in their entireties correspond to polar points of 202 (zenith) and 204 (nadir) of the 3D perspective view of FIG. 2. In other words, the reducing 3D perspective viewing angle range in the panning direction towards the polar points in FIG. 2 are stretched into the full pixel range in the horizontal direction 102 in the ERP-formatted pixel array of FIG. 1.

The 2D ERP representation above for a 360 panorama image is, by its nature, continuous in the panning direction.

As such, a continuity is expected to be preserved across the vertical edges 106 and 108 of the 2D data array of the ERP representation of FIG. 1.

A panorama image above may be generated from any 360-degree scene. For example, such 360-degree scene may be in an indoor or outdoor environment. A realistic or natural scene of any of such environments may be characterized by an object alignment dictated by gravity, which, for clarity and illustration purposes in this disclosure, is taken as the vertical direction above in FIGS. 1 and 2. A typical panorama image thus may be generated by panning around the gravity axis (along the vertical direction) and in the horizontal plane. However, the various implementations below are not limited to such a panorama geometrical arrangement.

Information Extraction from Panorama Images Based on Computer Vision

For some applications and image analytics tasks, additional information may be extracted or generated from an input image dataset based on computer vision techniques and modeling. Such information extraction or generation may include but is not limited to image classification, image segmentation, object identification and recognition, depth estimation, object layout generation, and the like. Just as imaging processing of regular 2D images, such information may also be extracted or generated from a panorama image using computer vision modeling. An input for such information extraction or generation, for example, may be the ERP dataset of the panorama image described above with respect to FIG. 1.

The extracted or generated information from a panorama image above may be of various types and complexity. For example, an output of a classification model may be simple and compact. On the other hand, an output dataset representing extracted or generated information, such as depths estimate information at each pixel, object layout, and semantic information of the pixels of the panorama image may be more complex. Such information may be used to construct, for example, depth maps, semantic maps, and layout.

Figure 3A:
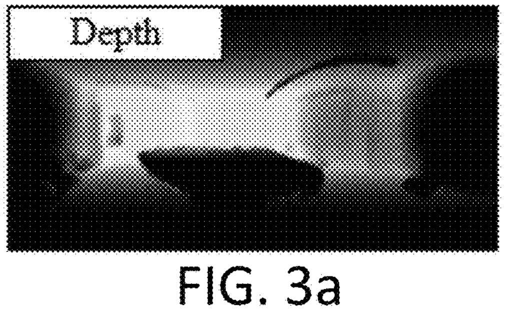
FIG. 3*a* shows an example depth map extracted from the 360 panorama image of FIG. 1.
Figure 3B:
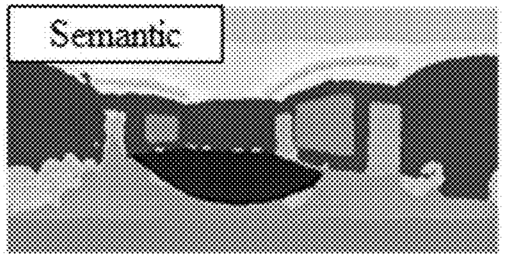
FIG. 3*b* shows an example semantic map extracted from the 360 panorama image of FIG. 1.
Figure 3C:
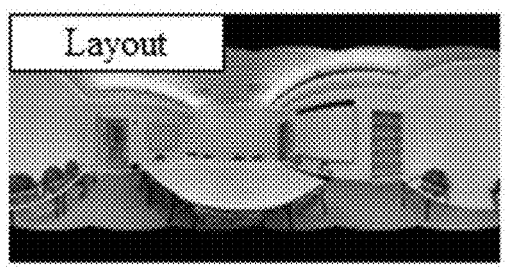
FIG. 3*c* shows an example layout extracted from the 360 panorama image of FIG. 1.

As an example, FIGS. 3*a*, 3*b*, and 3*c* illustrate a depth map, a semantic map, a layout map that may be extracted/generated from the ERP representation of the example panorama image 100 of FIG. 1, respectively. These example depth map, semantic map, and layout map are generated in the same ERP representation. In other words, each pixel in these maps may correspond to the same pixel or a group of pixels in the panorama image 100 of FIG. 1. The content of these maps, at pixel level, however, represent extracted depth, semantic, and layout information, rather than the direct measured optical information in the input panorama image 100 of FIG. 1. Such information, in a 2D array of similar size as or different size from the original data array of the panorama image, may be referred to as a mapping dataset. Such a mapping dataset may be extracted or generated based on the computer vision techniques and modeling. Such modeling thus may involve functionalities including but not limited to object recognition/identification, depth estimate, semantic extraction, and the like according to the specifics of the types of the mapping dataset being extracted or generated for a particular target task. The mapping datasets so generated may then be used to predict a 3D model for, e.g., the spatial contents of the panorama image.

For example, panorama depth prediction may be generated via computer vision modeling to determine 3D positions of objects recognized in the panorama image. For another example, panorama layout prediction may be generated via computer vision modeling to acquire a layout structure of the captured layout embedded in the panorama image of a 3D scene. For another example, panorama semantic segmentation may represent another important dense prediction task to generate pixel semantic information for understanding the content of the panorama image.

An example computer vision model for generating the mapping datasets above may include, for example, various neural networks (e.g., convolutional neural networks, CNNs) and/or other data analytics algorithms or components. The various example maps above may be crucial for many practical applications. In the indoor environment, such practically applications may include but are not limited to room reconstruction, robot navigation, and virtual reality applications. While early methods focus on modeling indoor scenes using perspective images. with the development of the CNNs and omnidirectional photography, panorama images has become candidates for the mapping datasets above. Compared to using traditional perspective images, panorama images have a larger FoV and provide geometric context, particularly of the indoor environment, that can be learned via training, in a continuous manner.

While the ERP format provides a convenient representation of a panorama image, modeling a holistic panorama scene in ERP format or representation by computer vision may be challenging. For example, as described above, the ERP distortion increases when the ERP pixels are close to the zenith or nadir of the panorama image, which may decrease the power of convolutional network structures that may be included in a computer vision model designed for distortion-free perspective images.

In some example implementation for negating the effects of ERP distortion above, a panorama may be first decomposed into perspective patches of, e.g., tangent images, so that the computer vision model can be configured to extract image information and features at a patch level where the relative distortion is less disparate across a patch (e.g., relatively distortion within each patch). However, partitioning a typical gravity aligned panorama image into discontinuous patches may break local continuity of gravity-aligned scenes and objects, thereby still limiting the performance of typical distortion free modeling.

The example embodiments in the disclosure below further provide a computer vision system involving a partitioning method and a neural network architecture for processing panorama images to extract or generate imaging information for understanding the content included in the panorama image that can negate the effect of the ERP distortion and at the same time maintain continuity between image partitions. These embodiments, while being particularly adapted and useful for information extraction and understanding of indoor panorama scene including gravity-aligned indoor objects and generated in the ERP representation, may also be applicable to analyzing panorama images in other environments and in representations other than the ERP format. The various neural networks in these embodiments may be pretrained using training panorama images, and may be retrained and updated as more training datasets become available.

Specifically, an input ERP panorama image may be partitioned in a continuous manner and the partitions may be processed by a neural network structure referred to as a PanelNet, which may be designed, configured, and trained as being capable of tackling major panorama understanding tasks such as depth estimation, semantic segmentation and layout prediction. In some example implementations, only the last one or a few layers of a decoder in the PanelNet may need to be slightly modified in order to accommodate the different extraction/generation tasks above.

In some example implementations that are further detailed below, the PanelNet may be based on at least two essential properties of the ERP presentation of a panorama image: (1) the ERP representation of the panorama image is continuous and seamless in the horizontal direction, as described above in relation to FIG. 1; and (2) the gravity plays an important role in object alignment in a typical panorama scene, particular in an indoor environment design, which makes designing and adapting the PanelNet for extracting gravity-aligned features crucial. As described in further detail below, an example panel representation of ERP may be adapted to these essential properties for processing by the PanelNet for improved performance in extracting/generating/predicting the mapping dataset described above. For example, an ERP dataset of a panorama image may be partitioned into consecutive panels with corresponding global and local 3D geometry, which preserves the gravity-aligned features within a panel and maintains the global continuity across panels. The PanelNet may include a geometry embedding network for panel representations that encodes both local and global features of panels for processing by an encoder within the PanelNet in order to reduce the negative effects of ERP distortion without adding further explicit distortion handling network. In some example implementations, a transformer network may be included as a feature processor, which may perform a local-to-global feature processing and extraction by local information aggregation using window blocks and accurate panel-wise context capturing using panel blocks in order to further enhance continuity.

Example Overall Architecture

Figure 4:
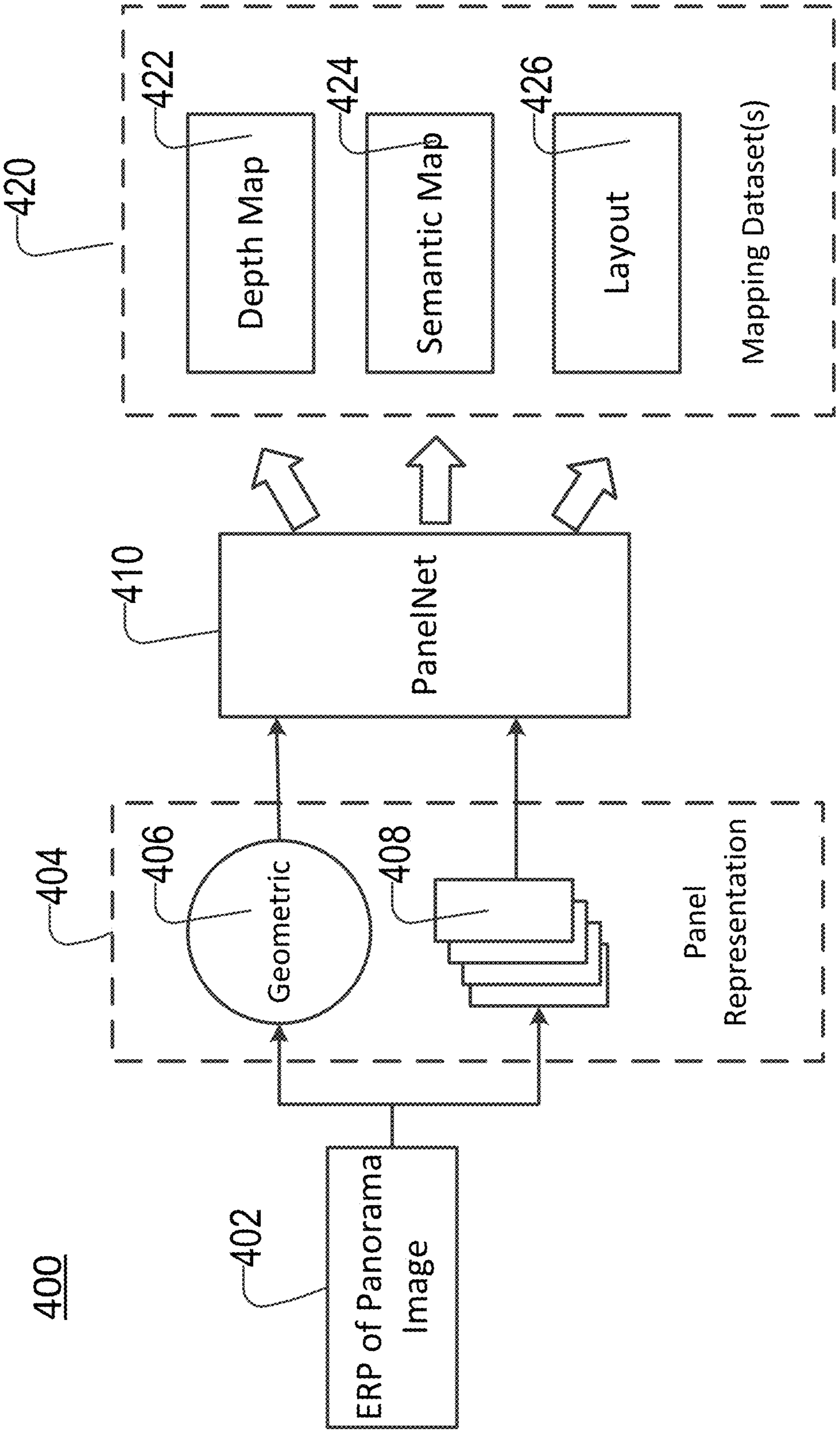
FIG. 4 shows an example block diagram of a system containing a PanelNet for processing panorama images to generate depth maps, semantic maps, and layouts.

FIG. 4 illustrates an example overall implementation 400 for processing ERP representation 402 of a panorama image. The example implementation 400 includes generating panel representations 404 comprising continuous panels 406 of the ERP as well as geometric representation 408 of the panels; processing the panel representations 404 by the PanelNet 410 to generate mapping dataset(s) 420 pertaining to, for example, at least one of a depth map 422, sematic map 424, and layout 426.

Figure 5:
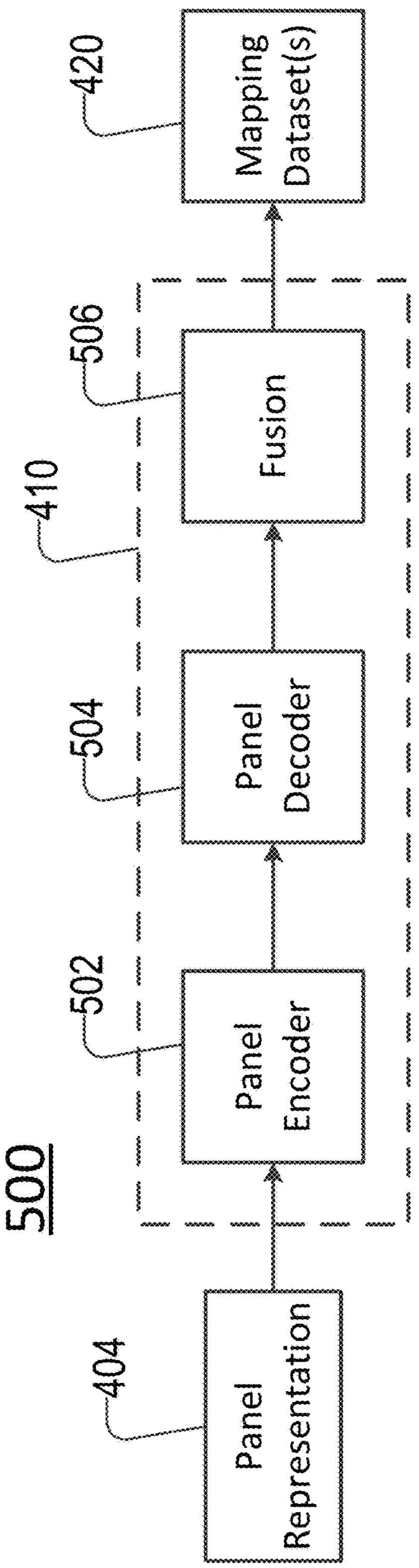
FIG. 5 shows an example implementation of the PanelNet of FIG. 4.

FIG. 5 shows further details of an example implementation 500 of the PanelNet 410 of FIG. 4. As shown in FIG. 5, the panel representation 404 may be processed by the PanelNet 410. The PanelNet 410 may be implemented in an encoder-decoder fashion, including a panel encoder 502, a panel decoder 504, and a fusion network 506 that sequentially process the panel representation 404 and for generate the mapping dataset(s) 420. The fusion network 506 may be configured to combine processed and mapped panels into the mapping dataset(s) 420.

Figure 6:
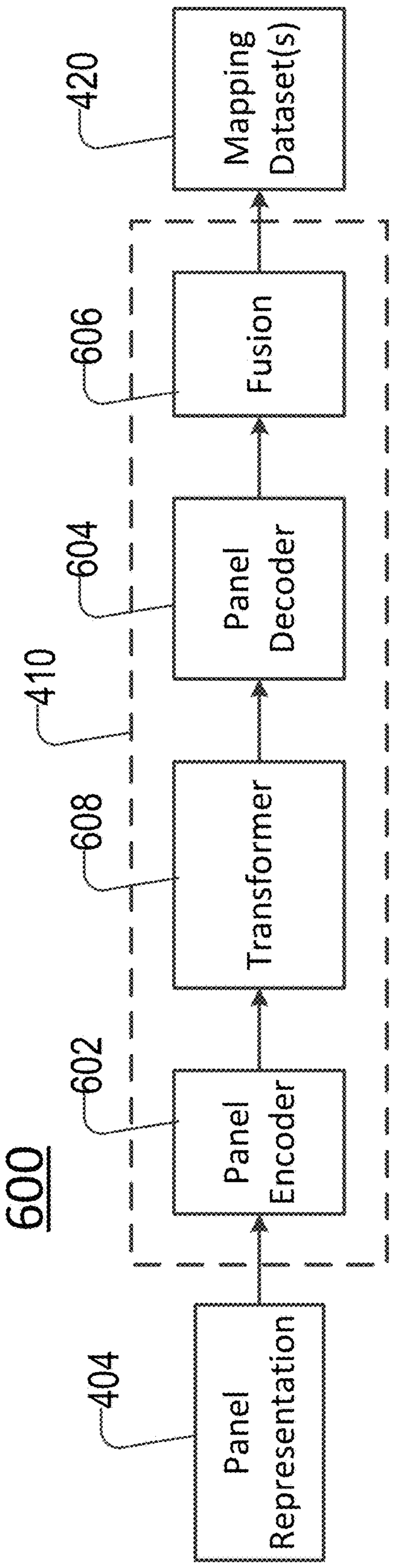
FIG. 6 shows another example implementation of the PanelNet of FIG. 4.

FIG. 6 shows further details of another example implementation 600 of the PanelNet 410 of FIG. 4. Compared to the example implementation 500 of FIG. 5, the example implementation 600 of FIG. 6 further includes a transformer 608 in the PanelNet 410. As such, the panel representation 404 may be processed by the panel encoder 602, the transformer 608, the panel decoder 604, and the fusion network 606 sequentially for generating the mapping dataset (s) 420. Other inter-block data dependencies between the various blocks of the PanelNet 410 of FIGS. 5 and 6 may be present but are not explicitly shown for simplicity.

Figure 7:
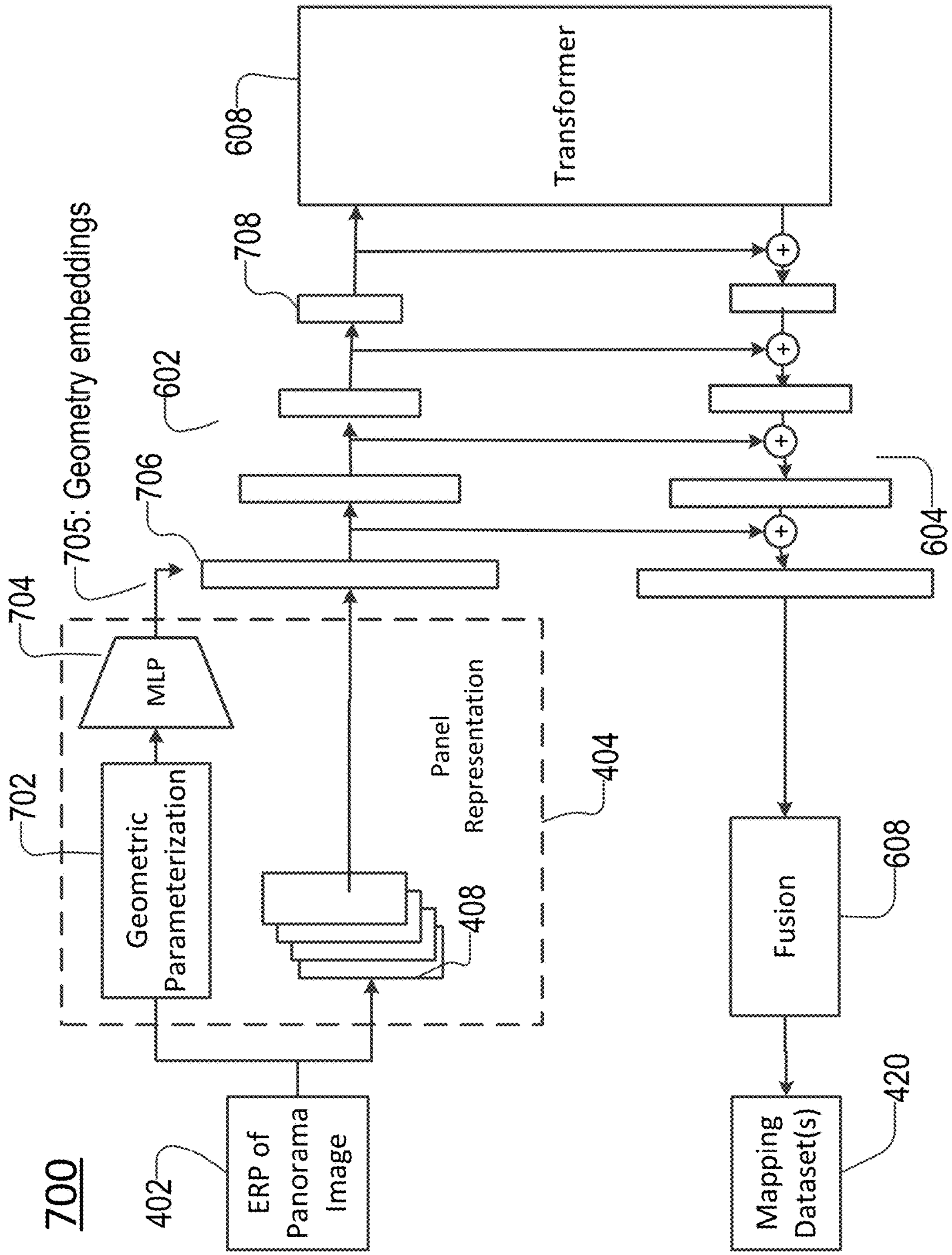
FIG. 7 shows example processing components of the PanelNet of FIG. 6.

FIG. 7 shows an example implementation 700 following FIG. 4 and FIG. 6 in further detail. The example implementation may include panel representation generation 404, the encoder network 602, the transformer network 608, the decoder network 604, the fusion network 608, with further detail being provided below.

Vertical Panel Partitioning and Geometry Embedding

In some example implementations of FIG. 7, the input ERP representation of the panorama image in, e.g., RGB or YUV, may contain $H_e \times W_e$ pixels in the height (vertical) and width (horizontal) directions. The input ERP representation may be partitioned to generate a plurality of ERP panels 408 using a masking window that continuously slides through the 2D array of the ERP representation 402 in the horizontal direction (the panning direction of the panorama image). The masking window may be of height $H_e$ spanning the entire vertical direction of the ERP representation 402 and may be of width or interval I (in pixels). The masking windows may slide at a stride S. As the two vertical edges of the input ERP (106 and 108 of FIG. 1) are continuous, the masking window would slide from one end to another end of the ERP representation horizontally by crossing one vertical edge into another vertical edge. The number of resulting consecutive panels would then be $N=W_e/S$. In some example implementations, the stride S may be smaller than the window width or interval I, and as such, the neighboring panels may overlap for reinforcing continuity between panels in the horizontal direction. As such, in the example implementations of paneling above, continuous and seamless vertical panels are generated. Because the ERP representation 402 is not partitioned in the vertical direction in such example implementations, the ERP panels 408 so generated would thus he continuous in the vertical direction without additional patching.

As illustrated in FIG. 7, the geometric representation of the ERP panels 408 may be further generated. Such geometric representation (406 of FIG. 4) may include geometry embeddings 705 as generated by a geometric parameterization process 702 of the vertical ERP panels 408 and then a generation of the geometry embeddings 705 by a geometry embedding network 704 (which, as further described in details, may be implemented as a multilayer perceptron (MLP) network). The incorporation of a geometry embedding network 704 for the generation of the geometric representation of the panels as the geometry embeddings 705 may facilitate reduction of the negative impact of panorama distortion in the ERP representation 402. The geometry embeddings may include a trained multidimensional embedding space and each of the geometry embedding may be a vector in the trained multidimensional embedding space and may represent each geometric parameter set parameterized via the geometric parameterization process 702.

In some example implementations, the geometry embedding generation process may be configured to combine geometry feature of the EPR panels with image feature together and to thus reduce the negative impact of the ERP distortion. A pixel $P_e(x_e, y_e)$ located in an ERP (where $x_e$, and $y_e$ represent the horizontal and vertical coordinates of the pixel in the ERP representation, respectively) would correspond to an angular position including $\varphi$ and $\theta$ representing the azimuth angle and the polar angle of the corresponding direction in the FoV. As such, a pixel in the EPR with pixel position $x_e$, $y_e$ may be mapped to an angular direction of ($\varphi$, $\theta$), which may further be converted to an absolute 3D world coordinate $P_s(x_s, y_s, z_s)$ on a unit sphere $P_s(\varphi, \theta)$ in the FOV with the following conversion relationship:

$$x_s = \sin\theta\cos\varphi$$

$$y_s = \sin\theta\sin\varphi$$

$$z_s = \cos\theta$$

The 3D world coordinates $P_s(x_s, y_s, z_s)$ of all pixels in all panels as converted may then be used to generate global geometric features. Since each ERP panel above has the same distortion profile in the vertical direction as any other ERP panels (as dictated by the manner in which the ERP is partitioned into vertical panels), the relative position of each pixel to the panel where it is located is also important. In some example implementations, a relative 3D local position P (x', y', z') for each pixel per ERP panel may be assigned. The global 3D world coordinates of a randomly selected ERP panel may be chosen to represent the relative 3D position of all ERP panels. Due to the vertical partitional manners for generating the ERP panels, $z_s$ would be equal to z'. As such, a final output parameter set of a point on an ERP panel from the geometric parametrization process 702 may be a combination of its local and global coordinates ($x_s$, $y_s$, $z_s$, x', y'). Such geometric parameter set for each of pixels of the ERP panels may be then input to the geometry embedding network 704 to generate the geometry embeddings 705.

As further shown in FIG. 7, the geometry embeddings representing both global and local geometric features may be generated by an MLP network 704, which, for example, may be implemented as a two-layer MLP network.

The pixel positions and various conversions between the ERP pixel positions and the 3D world coordinates would be determined by the partitioning of the vertical ERP panels. As described above, the vertical ERP panel partitioning is determined by the width I and stride S of the sliding windows. As such, the local and global geometric features are determined and are generated together as part the geometry embeddings 705, given I and S.

Figure 9:
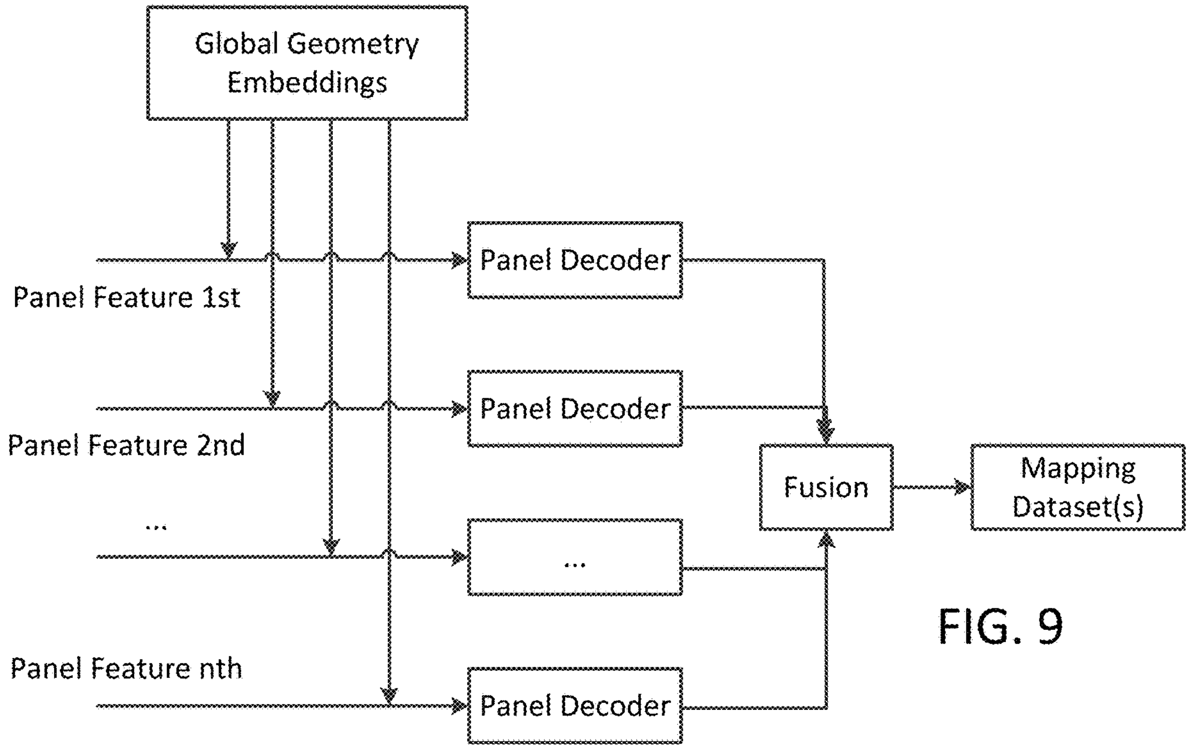
FIG. 9 shows an example processing flow for panel fusing to generate mapping datasets.

The global geometric features referred to as global geometry embeddings may thus be extracted across ERP panels to record the splite panel location in the panorama. The global geometry information, for example, may include panel location information in the panorama ERP image, such as, panel center pixel location in the ERP image and the boundary range of each panel in the ERP image, the sphere geometry in corresponding sphere coordinate, etc. The global features may be used by the decoder network (described in further detail below) across the ERP panels when processing each panel, as shown in FIG. 9, where the decoder network is shown as being used to process each panel (shown as panel decoder in FIG. 9) to generate mapping panels for fusion.

Encoder Network

As further shown in FIG. 7, the encoder network 602 may be configured to process the panel representation 404 with the help of the geometry embeddings 705. The encoder network 602 for example, may include a multi-layer down-sampling neural network to process the vertical ERP panels 408 to generate feature maps having decreasing resolutions. For example, the multi-layer down-sampling neural network of the decoder 602 may be based on a ResNet-34 based neural network architecture as the feature extractor. Merely as an example, the multi-layer down-sampling neural network may be configured to generate the feature maps in 4 different scales (or resolutions). The multi-layer down-sampling neural network of the decoder 602 may thus correspondingly include 4 stages of down-sampling network layers, as indicated in FIG. 7. The highest resolution layer (input layer) and the lowest resolution layer (output layer) are indicated by 706 and 708 respectively.

In some example implementations, a 1×1 convolution layer may be applied to reduce the dimensions of the final feature map of each EPR panel to $f_b \in R^{C_b \times H_b \times W_b}$, where, for example, $H_b = H_e/32$, $W_b = I/32$, $C_b = D/(H_{eb} \times W_{eb})$, and D=512 for any interval and stride.

As further shown in FIG. 7, the geometry features as included in the geometry embeddings 705 may be added to the first layer 706 (the highest resolution layer) of the encoder network 602 to make the encoder network 602 aware of ERP distortion. For example, a geometry embedding vector or features associated with positions of each pixel position may be generated as described above and combined with image content of the corresponding pixel of the vertical panel at the highest resolution layer 706 of the encoder 602 so that both the global and local geometric features are incorporated into the encoder network 602.

Transformer Network

As further shown in the example implementation of FIG. 7, the final feature maps 708 (e.g., having the lowest resolution) may then be used as input to the transformer network 608.

In some examples, the transformer network 608 may be implemented as a local-to-global transformer network for performing information aggregation as described in further detail below, to particularly extract long-range dependencies in distant ERP panels.

Specifically, although partitioning the ERP into consecutive vertical panels via a sliding window as described above may help preserve the continuity of structure or objects in the panorama scene, capturing the long-range dependencies is still crucial. Since the ERP representation is seamless in the horizontal direction, two distant vertical ERP panels on a panorama may have a closer realistic distance and thus correlated. Such correlation may not be easily captured. To address this problem and further improve local information aggregation, the local-to-global transformer network 608 may be designed and configured to include at least two major important components: (1) Window Blocks to enhance the geometry relations within a local panel, and (2) Panel Blocks for capturing long-range context among panels. An example local-to-global transformer network is shown as 800 in FIG. 8.

In some example implementations, for each ERP panel, the input feature map $f_b \in R^{C_b \times H_b \times W_b}$ from the last layer of the decoder 602 may be shaped into a sequence of flattened 2D feature patches $f_w \in R^{N_w \times (P^2 \cdot C_b)}$, where (P×P) represents the size of the feature patch and $N_w = H_b W_b / P^2$ is the number of feature patches in a current Window Block. In some example implementations, P may be 1, 2, 4 for Window Blocks in different resolutions. A learnable position embedding $E_w \in R^{N_w \times (P_2 \cdot C_b)}$ to maintain the positional information of feature patches.

In Panel Blocks, global information may be aggregated via panel-wise multi-head self-attention. The feature maps of all panels may be compressed to N 1-D feature vectors $f_p \in R^{N \times D}$ and then used as tokens in the Panel Blocks.

Similar to Window Blocks, a learnable positional embedding $E_p \in R^{N \times D}$ may be added to the tokens to retain patch-wise positional information.

Figure 8:
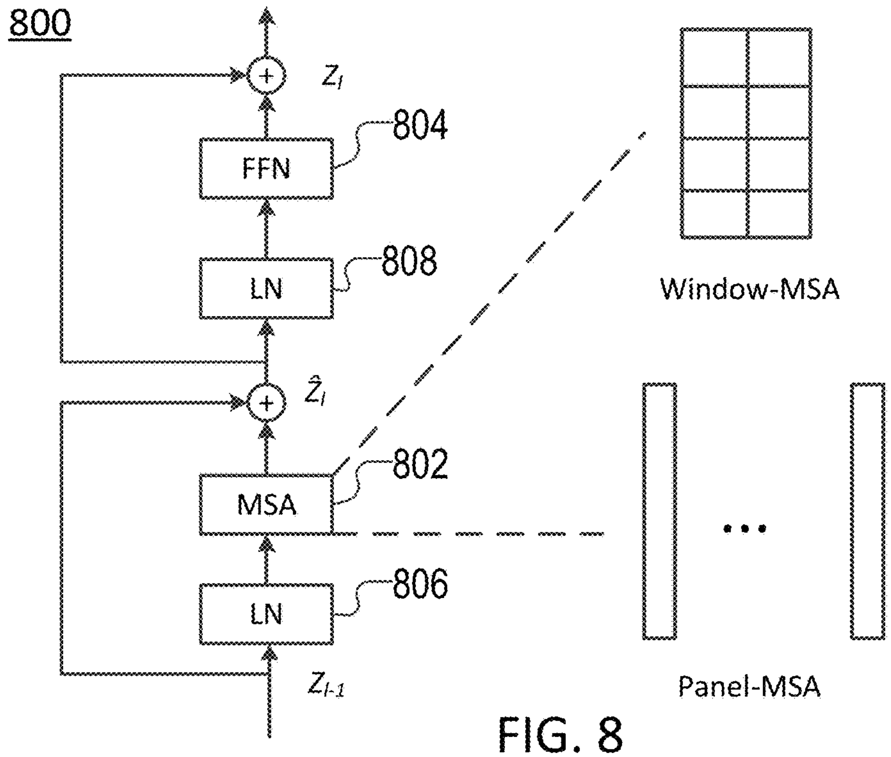
FIG. 8 shows example processing components of the local-to-global transformer network of the PanelNet of FIG. 7.

In some example implementations, and as shown in the example local-to-global transformer network 800 of FIG. 8, multi-head self-attention module (MSA) 802 and Feed-Forward Network (FFN) 804 may be stacked together. A LayerNorm (LN) operation may be performed before each MSA and FFN, as shown by 806 and 808. As further shown by FIG. 8, a Local-to-Global Transformer block may be computed as $$\hat{z}_l = (W/P) - MSA(LN(z_{l-1})) + z_{l-1}$$

$$z_l = FFN(LN(\hat{z}_l)) + \hat{z}_l$$

where l is the block number of each stage, and $\hat{z}_l$ and $z_l$ represent the output feature map of the Window/Panel—MSA and FFN. To aggregate the features from local to global, the Window Blocks may be stacked according to the window size from small to high successively. The Panel Blocks may be stacked after the Window Blocks, as shown in FIG. 8. In some example implementations, multiple., e.g., 12, transformer blocks may be used and they may be placed in the following example order: Low-Res Window-Blocks (2), Mid-Res Window-Blocks (2), High-Res Window-blocks (2), Panel Blocks (6). Performance of the transformer network may drop when shuffling this order because the compress operation in Panel Blocks reduces the impact of local information aggregation performed by Window Blocks.

Decoder Network and Fusion Network

As illustrated in FIG. 7, the output from the local-to-global transformer network 608 may be provided to the decoder network 604. The decoder network 604 may be implemented as a multi-layer or multi-stage up-sampling network for recovering the original resolution of the ERP panels.

In some example implementations, for each decoder layer, its feature map may be concatenated with the feature map generated by a corresponding layer or stage in the encoder 602, as indicated by the vertical arrows from the encoder 602 to decoder 604 in FIG. 7. As such, the up-conversion stages decoder 604 may be configured to reversely correspond to down-conversion stages of the encoder 602. The multi-layer up-sampling network may thus be implemented by multiple stages of up-convolutions to gradually recover the feature map to the input resolution of the ERP panels.

The output from the decoder 604 may represent panel-wise mapping datasets, and may be referred to as mapping panels. The mapping panels, at each pixel, may contain predicted information such as depth information, layout information, or semantic information, rather than the original RBG or YUV image information. The mapping panels may then be fused or merged together to form the overall mapping dataset(s) corresponding to the input ERP.

In some example implementations, a learnable confidence map may be predicted by the fusion network 608 to improve the final merged or fused result. For the final merge, an average of the prediction of all mapping panels may be taken. In some example implementations, by slightly modifying the network structure, the model of FIG. 7 that are trained for predicting one type of mapping datasets (e.g., layout) may be trained and may be capable of predicting mapping datasets for another 360 dense prediction tasks (e.g., semantic segmentation). In one example of applying the model of FIG. 7 for layout prediction in an indoor environment, an LGT-Net representation may be adopted for representing room layouts as floor boundary and room height. In some example implementations, one linear layer for generating floor boundary after the last decoder layer and two linear layers for generating room height may be added to the model of FIG. 7. In some example implementations, a default length of an output 1-D floor boundary may be adopted as 1024.

Loss Function

The model of FIG. 7 may be jointly trained or trained in stages (by iteratively fixing some sub networks and train other sub networks). Loss functions may be engineered according to the particular prediction task. As an example, for depth estimation, the loss function may be based on a Reverse Huber Loss (BerHu). In some example implementations, the training may be performed in a fully supervised manner. An example BerHu loss function, may be expressed in the form of:

$$B(e) = \begin{cases} |e| & |e| \le c \\ e^2 + c^2/2c & |e| > c \end{cases}$$

where e represents an error term and an error threshold c is used to determine where a switch from L1 loss (e.g., least absolute deviation) to L2 loss (e.g., least squire errors) occurs. The combination of L1 loss for horizontal depth and room height, normal loss and normal gradient loss may be optimized for training the model of FIG. 7 for indoor environments.

For semantic segmentation prediction, in some example implementations, a loss function based on Cross-Entropy Loss with class-wise weights may be used.

Example PanelNet Training and Testing

For testing the PanelNet implementations above, a real-world dataset consisting of 1,413 panoramas collected in 6 large-scale indoor areas, referred to as Stanford2D3D is used. For depth estimation, a split of the dataset into area 1, area 2, area 3, area 4, area 6 for training and area 5 for testing is adopted. For semantic segmentation, a 3-fold split of the data set is adopted for training, evaluation, and testing. Example resolutions used for depth estimation and semantic segmentation are 512×1024 and 256×512, respectively.

In addition, datasets referred to as PanoContext and the extended Stanford2D3D are also used for training and testing of the PanelNet implantations above. These two datasets include two cuboid room layout datasets. PanoContext, for example, contains 514 annotated cuboid room layouts collected from the SunCG dataset. Specifically, 571 panoramas were collected from Stanford2D3D and annotated with room layouts. The input resolution of both datasets is 512×1024. A same example split above for training and testing is adopted for these datasets.

Further, dataset referred to as Matterport3D may also be used. This dataset includes a large-scale RGB-D dataset that contains 10,800 panoramic images collected in 90 indoor scenes. This dataset may be particularly used for our depth estimation training evaluation and testing. The data set may be split into 7829 panoramas from 61 houses for training and the rest for testing. The resolution of 512×1024 may be used for training and testing.

Further, for depth estimation, the performance of the PanelNet implementations may be evaluated using standard depth estimation metrics, including Mean Relative Error (MRE), Mean Absolute Error (MAE), Root Mean Square Error (RMSE), log-based Root Mean Square Error (RMSE (log)) and threshold-based precision, e.g., $\delta^1$, $\delta^2$ and $\delta^3$. For semantic segmentation, performance of the PanelNet implementations is evaluated using standard semantic segmentation metrics including class-wise mIoU and class-wise mAcc. For layout prediction, the performance of the PanelNet implementations is evaluated using 3D Intersection over Union (3DIoU).

The PanelNet model(s) may be implemented in PyTorch and trained on, for example, eight NVIDIA GTX 1080 Ti GPUs with a batch size of 16. The network is trained using Adam optimizer, and the initial learning rate may be set to 0.0001. For the depth estimation, the network/model may be trained on Stanford2D3D dataset above for, e.g., 100 epochs, and Matterport3D dataset above for, e.g., 60 epochs. The network/model may be trained with 200epochs on semantic segmentation datasets above, and 1000 epochs on layout prediction datasets above. Random flipping, random horizontal rotation and random gamma augmentation may be further adopted for data augmentation. Example default stride and interval for depth estimation of 32 and 128 respectively may be used while the stride may be set to, for example, 16, for semantic segmentation.

The method for PanelNet above may be evaluated against state-of-the-art panorama depth estimation algorithms in Table 1 below. The results may be averaged by the best results from three training sessions. The results of SliceNet on Stanford2D3D were re-produced by the fixed metrics and a 2-iteration Omnifusion model is retrained and reevaluated on the corresponding Matterport3D dataset. Table 1 shows that the PanelNet model implementations outperform existing models on all metrics on both datasets.

TABLE 1

| Dataset | Method | MRE | MAE | RMSE | RMSE (log) | $\delta^1$ | $\delta^2$ | $\delta^3$ |
|---|---|---|---|---|---|---|---|---|
| Stanford2D3D | FCRN | 0.1837 | 0.3428 | 0.5774 | 0.1100 | 0.7230 | 0.9207 | 0.9731 |
| | OmniDepth | 0.1996 | 0.3743 | 0.6152 | 0.1212 | 0.6877 | 0.8891 | 0.9578 |
| | Bifuse | 0.1209 | 0.2343 | 0.4142 | 0.0787 | 0.8660 | 0.9580 | 0.9860 |
| | HoHoNet | 0.1014 | 0.2027 | 0.3834 | 0.0668 | 0.9054 | 0.9693 | 0.9886 |
| | SliceNet | 0.1043 | 0.1838 | 0.3689 | 0.0771 | 0.9034 | 0.9645 | 0.9864 |
| | Omnifusion | 0.1031 | 0.1958 | 0.3521 | 0.0698 | 0.8913 | 0.9702 | 0.9875 |
| | PanelNet | 0.0829 | 0.1520 | 0.2933 | 0.0579 | 0.9242 | 0.9796 | 0.9915 |
| Matterport3D | FCRN | 0.2409 | 0.4008 | 0.6704 | 0.1244 | 0.7703 | 0.9174 | 0.9617 |
| | OmniDepth | 0.2901 | 0.4838 | 0.7643 | 0.1450 | 0.6830 | 0.8794 | 0.9429 |
| | Bifuse | 0.2048 | 0.3470 | 0.6259 | 0.1143 | 0.8452 | 0.9319 | 0.9632 |
| | HoHoNet | 0.1488 | 0.2862 | 0.5138 | 0.0871 | 0.8786 | 0.9519 | 0.9771 |
| | SliceNet | 0.1764 | 0.3296 | 0.6133 | 0.1045 | 0.8716 | 0.9483 | 0.9716 |
| | Omnifusion | 0.1387 | 0.2724 | 0.5009 | 0.0893 | 0.8789 | 0.9617 | 0.9818 |
| | PanelNet | 0.1150 | 0.2205 | 0.4528 | 0.0814 | 0.9123 | 0.9703 | 0.9856 |

In comparison to the PanelNet implementations, the method that directly operate on the panoramas predict continuous background while lacking object details. The fusion-based method generates sharp depth boundaries while artifacts caused by patch-wise discrepancy lead to inconsistent depth prediction which is not removable with its patch fusion module or iteration mechanism. PanelNet implementations, however, with the help of the Local-to-Global Transformer network above, preserves the geometric continuity of the room structure and shows superior performance even for some challenging scenarios. The PanelNet model is also capable of generating sharp object depth edges.

The PanelNet is further evaluated against state-of-the-art panorama semantic segmentation methods, as shown in Table 2 below. The PanelNet model improves the mIoU metrics by 6.9% and mAcc metrics by 8.9% against, for example, the existing Ho-HoNet implementations. The PanelNet provides a strong ability to segment out objects with a smooth surface. The segmentation edges generated by the PanelNet appear natural and continuous. This is because the Local-to-Global Transformer network is capable of successfully capturing geometric context of the object. The PanelNet model is also capable of segmenting out small objects from the background. The segmentation boundaries of the ceiling and the walls generated by the PanelNet model are highly smooth, indicating the power of the panel geometry embedding network capable of learning the ERP distortion.

TABLE 2

| Method | Input | mIoU | mAcc |
|---|---|---|---|
| TangentImg | RGB-D | 41.8 | 54.9 |
| HoHoNet | RGB-D | 43.3 | 53.9 |
| PanelNet | RGB | 46.3 | 58.7 |

The PanelNet model method is further evaluated against state-of-the-art panorama layout estimation methods, as shown in Table 3 below. By adding linear layers at the end of the depth estimation network as described above, the PanelNet model achieves competitive performance against state-of-the-art methods designed specifically for layout estimation. Since the PanelNet mode is initially designed for dense prediction, it suffers an information loss in the process of upsampling and channel compression. The layout model based on the PanelNet shares the same structure with the depth estimation model before the linear layers. The PanelNet model may be activated with the weights pretrained on depth estimation datasets to reduce the training overhead. The layout prediction model based on the PanelNet has the highest performance when the stride is set at 64 and the interval is set at 128.

TABLE 3

| Method | PanoContext | Stanford2D3D |
|---|---|---|
| LayoutNet v2 | 85.02 | 82.66 |
| DuLa-Net v2 | 83.77 | 86.60 |
| HorizonNet | 84.23 | 83.51 |
| AtlantaNet | — | 83.94 |
| LGT-Net | 85.16 | 85.76 |
| PanelNet | 84.52 | 85.91 |

Ablation studies may be further performed to evaluate impact of the various elements and hyper-parameters of the PanelNet on, for example, the Stanford2D3D dataset for depth estimation, as shown in Table 4 below. The stride may be set at an example value of 32 and the interval at an example value of 128 for all networks. The baseline model with a ResNet-34 encoder and a depth decoder as illustrated above may be used. Since partitioning the entire panorama into vertical panels with overlaps greatly increase the computational complexity, the ResNet-34 rather than vision Transformers may be used as the backbones (the encoder and the decoder). As shown in Table 4, the performance improvement of adding the panel geometry embedding network to the pure CNN structure of the PanelNet may be small since the network's ability to aggregate distortion information with image features is low. However, by applying the Local-to-Global Transformer network as a feature processor, the baseline network gains a significant performance improvement on all evaluation metrics. Benefiting from the information aggregation ability of the Local-to-Global Transformer network, the panel geometry embedding network performs its ability on distortion perception to a fuller extent and improves the performance both quantitatively and qualitatively. The combination of the Local-to-Global Transformer network and panel geometry embedding network leads to the clearest object edges in depth estimation. The effect of the panel-wise relative position embedding similar to the LGT-Net is further evaluated for Panel Blocks. However, it appears that it brings minimal performance improvements on depth estimation while increasing the computational complexity.

tangent patches lower the ability of the Window Blocks to aggregate local information in the vertical direction which reduces the continuity of depth estimation for gravity-aligned objects and scenes. On the contrary, the vertical continuity is preserved within the vertical panels of the PanelNet. With the panel representation, the Local-to-Global Transformer exerts its greatest information aggregation ability.

TABLE 5

| Method | MRE | MAE | RMSE | $\delta^1$ | $\delta^2$ |
|---|---|---|---|---|---|
| Omnifusion w/o Trans. | 0.1132 | 0.1932 | 0.3248 | 0.8728 | 0.9690 |
| PanelNet w/o Trans. | 0.1000 | 0.1815 | 0.3149 | 0.9012 | 0.9775 |
| Omnifusion w/L2G | 0.1054 | 0.1918 | 0.3351 | 0.8870 | 0.9754 |
| PanelNet w/L2G | 0.0829 | 0.1520 | 0.2933 | 0.9242 | 0.9796 |

The effect of panel size and stride of the PanelNet on the performance and speed of the model is further evaluated, as shown in Table 6. For Table 6, the FPSs are obtained by measuring the average inference time on a single NVIDIA GTX 1080Ti GPU. It is observed that for PanelNet models that have the same panel interval, i.e. sliding widow width, a smaller stride enhances the performance. For the same stride, the PanelNet models with larger panels have better performance. Theoretically, smaller strides improve performance because horizontal consistency is preserved by the more overlapping area of consecutive panels. Larger panels also lead to better performance because larger panels provide larger FoV, which contains more geometric context within a panel. However, it is observed that keeping increasing the interval may have a negative impact on performance. Specifically, the larger panel brings higher computational complexity, which forces the stride to increase to reduce the computational overhead. This makes the performance gain brought by the larger FoV being negated by the consistency loss due to fewer overlaps. To gain the best performance, the interval may be set to, for example, 128, and the stride may be set to, for example, 32.

TABLE 4

| Method | Train Mem. | MRE | MAE | RMSE | $\delta^1$ | $\delta^2$ |
|---|---|---|---|---|---|---|
| Baseline | 10231 | 0.1033 | 0.1859 | 0.3212 | 0.8976 | 0.9741 |
| Baseline + Geo(G) | 10371 | 0.1029 | 0.1861 | 0.3205 | 0.8980 | 0.9765 |
| Baseline + Geo(G + L) | 10509 | 0.1000 | 0.1815 | 0.3149 | 0.9012 | 0.9775 |
| Baseline + Transformer(P) | 10359 | 0.0904 | 0.1652 | 0.3058 | 0.9123 | 0.9776 |
| Baseline + Transformer(P + W) | 10379 | 0.0854 | 0.1610 | 0.3016 | 0.9164 | 0.9785 |
| Baseline + Geo(G + L) + Transformer(P) | 10639 | 0.0851 | 0.1572 | 0.2954 | 0.9218 | 0.9789 |
| Baseline + Geo(G + L) + Transformer(P + W) | 10659 | 0.0829 | 0.1520 | 0.2933 | 0.9242 | 0.9796 |

An ablation study to may be further conducted to validate the usefulness of panel representation against, for example tangent image partitioning. Omnifusion implementations may be used as a comparison since it has a similar input format and can be trained via the same encoder-decoder CNN architecture with the PanelNet model. The comparison is shown in Table 5. As shown in Table 5, the panel representation with pure CNN architecture outperforms the original Omnifusion, which demonstrates the superiority of panel representation. The default transformer of Omnifusion may be replaced with the Local-to-Global Transformer network. However, the Local-to-Global Transformer network does not appear to bring a significant performance improvement for tangent images since the discontinuous

TABLE 6

| I | S | #Panel | FPS | MRE | RMSE | $\delta^1$ |
|---|---|---|---|---|---|---|
| 64 | 16 | 128 | 6.4 | 0.0866 | 0.3040 | 0.9181 |
| 64 | 32 | 64 | 12.4 | 0.0909 | 0.3207 | 0.9102 |
| 64 | 64 | 32 | 24.4 | 0.0952 | 0.3319 | 0.9041 |
| 128 | 32 | 32 | 6.9 | 0.0829 | 0.2933 | 0.9242 |
| 128 | 64 | 16 | 13.5 | 0.0892 | 0.3109 | 0.9172 |
| 128 | 128 | 8 | 25.7 | 0.0920 | 0.3181 | 0.9103 |
| 256 | 64 | 16 | 7.5 | 0.0894 | 0.3047 | 0.9132 |
| 256 | 128 | 8 | 13.9 | 0.0908 | 0.3069 | 0.9182 |
| 256 | 256 | 4 | 26.4 | 0.0986 | 0.3248 | 0.8991 |

The techniques described above, can be implemented as computer software using computer-readable instructions and physically stored in one or more computer-readable media. For example, FIG. 10 shows a computer system (1000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
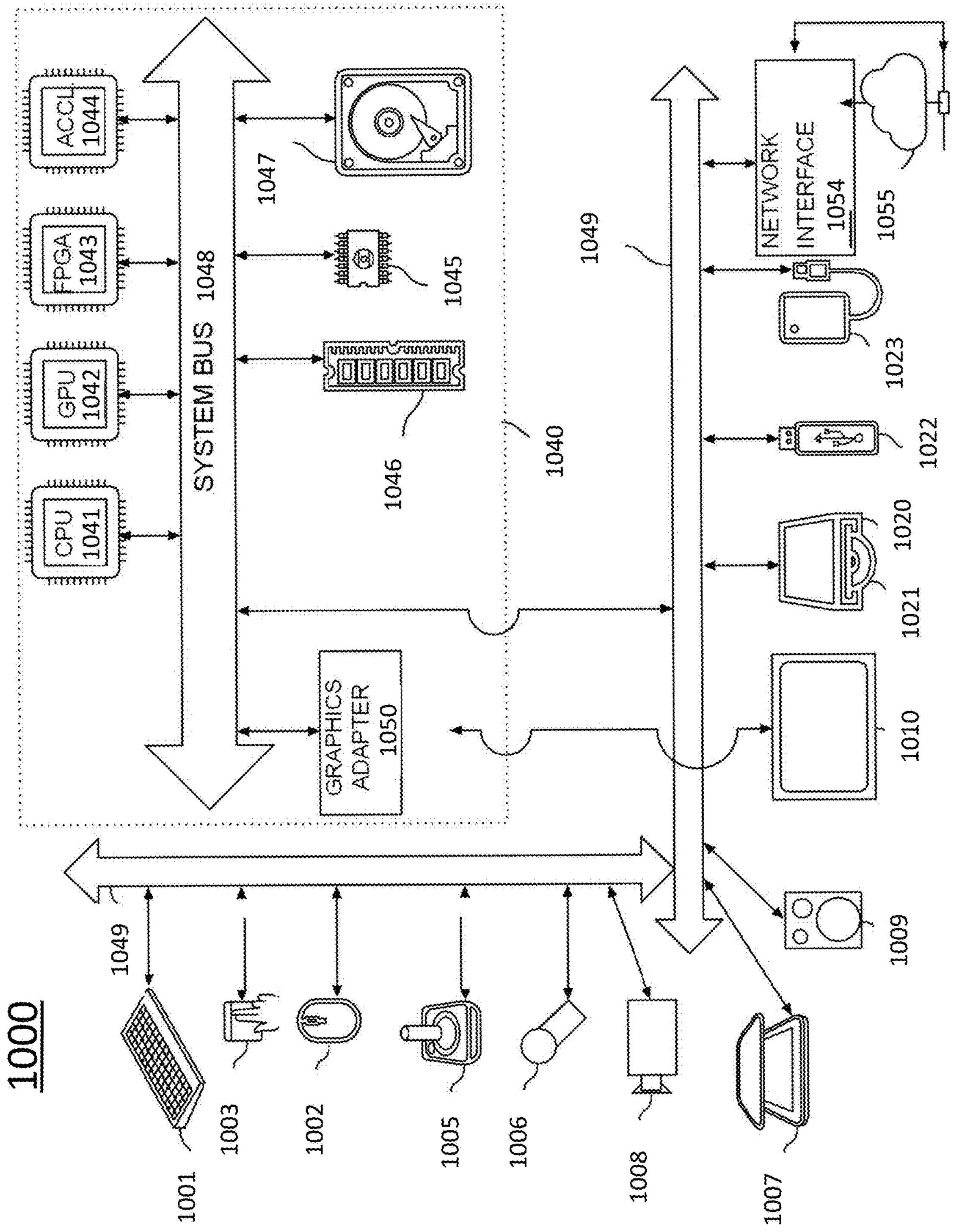
FIG. 10 shows a schematic illustration of a computer system in accordance with example embodiments of this disclosure.

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). In an example, the screen (1010) can be connected to the graphics adapter (1050). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for processing a panorama image dataset by a computing circuitry, comprising:
- generating a plurality of data panels from the panorama image dataset;
- executing a first neural network to process the plurality of data panels to generate a set of embeddings representing geometric features of the plurality of data panels;
- executing a second neural network to process the plurality of data panels and the set of embeddings to generate a plurality of mapping panels; and
- fusing the plurality of mapping panels into a mapping dataset of the panorama image dataset, wherein the panorama image dataset comprises a data array in two dimensions; and the each of the plurality of data panels comprises a subarray of the data array in an entirety of a first dimension of the two dimensions and a segment of a second dimension of the two dimensions.

2. The method of claim 1, wherein the mapping dataset comprises one of a depth map, a layout map, or a semantic map corresponding to the panorama image dataset.

3. The method of claim 1, wherein the first dimension represents a gravitational direction of the panorama image dataset and the second dimension represents a horizontal direction of the panorama image dataset.

4. The method of claim 1, wherein the plurality of data panels are generated from the panorama image dataset consecutively using a window having a length of the entirety of the first dimension in the first dimension and a predefined width in the second dimension, the window sliding along the second dimension by a predefined stride.

5. The method of claim 4, wherein the window continuously slides across from one edge of the panorama image dataset in the second dimension into another edge of the panorama image dataset in the second dimension.

6. The method of claim 1, wherein the first neural network is configured to encode local and global geometric features of the plurality of data panels to reduce impact of geometric distortions in the panorama image dataset and to enhance preservation of geometric continuity across the plurality of mapping panels.

7. The method of claim 1, wherein the first neural network comprises a multilayer perceptron (MLP) network LP for processing geometric information extracted from the plurality of data panels to generate the set of embeddings comprising a set of global geometric features and a set of local geometric features of the plurality of the data panels.

8. The method of claim 7, wherein the second neural network is configured to process the plurality of data panels and reduce geometric distortions in the panorama image dataset based on the set of embeddings.

9. The method of claim 7, wherein the second neural network comprises:

a down-sampling network;

a transformer network; and an up-sampling network.

10. The method of claim 9, wherein:

the down-sampling network is configured for processing the plurality of data panels and the set of embeddings to generate a series of down-sampled features with decreasing resolutions;

the transformer network is configured for processing lowest resolution down-sampled features to generate transformed low-resolution features; and the up-sampling network is configured for processing the transformed low-resolution features and the series of down-sampled features to generate the plurality of mapping panels.

11. The method of claim 9, wherein the transformer network comprises a feature processor.

12. The method of claim 11, wherein the feature processor is configured to increase continuity of the geometric features.

13. The method of claim 11, wherein the feature processor is configured to aggregate local information within each of the plurality of data panels to capture panel-wise context.

14. An apparatus for processing a panorama image dataset, the apparatus comprising a memory for storing computer instructions and at least one processor for executing the computer instructions to:

generate a plurality of data panels from the panorama image dataset;

execute a first neural network to process the plurality of data panels to generate a set of embeddings representing geometric features of the plurality of data panels;

execute a second neural network to process the plurality of data panels and the set of embeddings to generate a plurality of mapping panels; and fuse the plurality of mapping panels into a mapping dataset of the panorama image dataset, wherein the panorama image dataset comprises a data array in two dimensions; and the each of the plurality of data panels comprises a subarray of the data array in an entirety of a first dimension of the two dimensions and a segment of a second dimension of the two dimensions.

15. The apparatus of claim 14, wherein:

the plurality of data panels are generated from the panorama image dataset consecutively using a window having a length of the entirety of the first dimension in the first dimension and a predefined width in the second dimension, the window continuously sliding along the second dimension by a predefined stride and across from one edge of the panorama image dataset in the second dimension into another edge of the panorama image dataset in the second dimension; and the first neural network is configured to encode local and global geometric features of the plurality of data panels to reduce impact of geometric distortions in the panorama image dataset and to enhance preservation of geometric continuity across the plurality of mapping panels.

16. The apparatus of claim 14, wherein:

the first neural network comprises a multilayer perceptron (MLP) network LP for processing geometric information extracted from the plurality of data panels to generate the set of embeddings comprising a set of global geometric features and a set of local geometric features of the plurality of the data panels;

the second neural network comprises a down-sampling network, a transformer network, and an up-sampling network;

the down-sampling network is configured for processing the plurality of data panels and the set of embeddings to generate a series of down-sampled features with decreasing resolutions;

the transformer network is configured for processing lowest resolution down-sampled features to generate transformed low-resolution features; and the up-sampling network is configured for processing the transformed low-resolution features and the series of down-sampled features to generate the plurality of mapping panels.

17. The apparatus of claim 16, wherein:

the transformer network comprises a feature processor; and the feature processor is configured to increase continuity of the geometric features and to aggregate local information within each of the plurality of data panels to capture panel-wise context.

18. A method of generating a mapping dataset, the method comprising:

generating the mapping dataset from a panorama image dataset according to a neural network framework, wherein the mapping dataset includes a plurality of mapping panels fused from the panorama image dataset; and the neural network framework specifies that:

a plurality of data panels are generated from the panorama image dataset, the panorama image dataset comprising a data array in two dimensions, and the each of the plurality of data panels comprising a subarray of the data array in an entirety of a first dimension of the two dimensions and a segment of a second dimension of the two dimensions;

a first neural network processes the plurality of data panels to generate a set of embeddings representing geometric features of the plurality of data panels;

a second neural network processes the plurality of data panels and the set of embeddings to generate the plurality of mapping panels; and the plurality of mapping panels are fused into the mapping dataset.

* * * * *